C. L. WAGANDT.
BAIL EAR FOR TAPERED BUCKETS.
APPLICATION FILED MAY 9, 1910.
997,938.
Patented July 11, 1911.
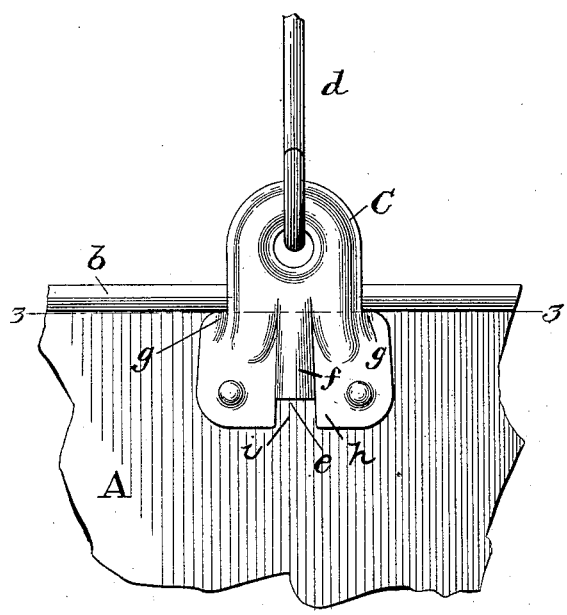
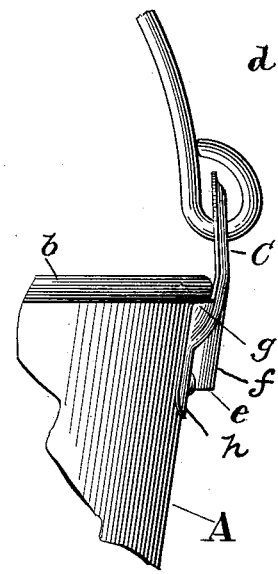
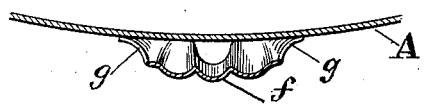
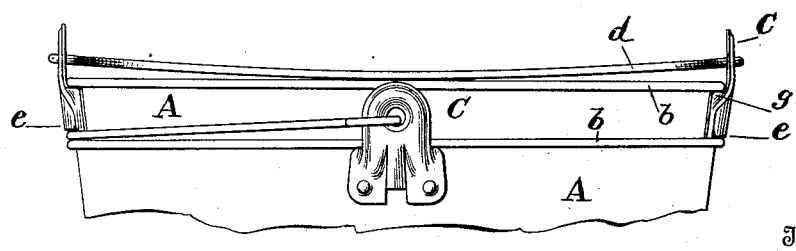
Witnesses
Edwin L. Bradford
J. Ferdinand Vogt
Inventor
Charles L. Wagandt
By Mann & Co.
Attorneys

UNITED STATES PATENT OFFICE.

CHARLES L. WAGANDT, OF BALTIMORE, MARYLAND, ASSIGNOR TO NATIONAL ENAMELING AND STAMPING COMPANY, OF BALTIMORE, MARYLAND, A CORPORATION OF NEW JERSEY.

BAIL-EAR FOR TAPERED BUCKETS.

997,938.  Specification of Letters Patent. Patented July 11, 1911.

Application filed May 9, 1910. Serial No. 560,168.

*To all whom it may concern:*

Be it known that I, CHARLES L. WAGANDT, a citizen of the United States, residing at Baltimore, in the State of Maryland, have invented certain new and useful Improvements in Bail-Ears for Tapered Buckets, of which the following is a specification.

This invention relates to an improvement in bail-ears for flaring or tapered pails.

Buckets or pails are made in tapering form, the top being larger than the bottom and the wall of the bucket tapered from the top to the bottom to enable the buckets or pails to be nested one into the other. In nesting buckets, however, it is found that they frequently become so tightly wedged one within the other as to stick fast, and at such times it is a difficult matter to separate them. The desideratum is to provide tapered buckets with an inexpensive bail-ear that will prevent them, when placed one within another, from becoming tightly wedged.

The invention may be embodied in several forms, one form is to combine the stop-device with one or both of the ears to which the bail is attached.

One form of the improved device is shown in the accompanying drawing in which,—

Figure 1 shows a broken portion of the side wall of a tapered bucket having an attached bail-ear provided with the improved antiwedge device. Fig. 2 is a view of the same parts of Fig. 1 as seen in a transverse direction. Fig. 3 is a horizontal section of the wall of the bucket and of the bail-ear on the line 3—3. Fig. 4 is a side view of the top parts of two tapered buckets in "nested" position.

The letter, A, designates the side wall of a flaring or tapered bucket; in the present instance the bucket shown would be made of sheet-metal, and has an outward-rolled top-rim, $b$. The wall of the bucket is flaring or tapered to enable one bucket to "nest" within another; a dozen buckets may be thus nested together to get them in small compass for purposes of transportation.

The improved bail-ear comprises a single metal-plate whose lower part may be attached by rivets or electric welding to the outer surface of the wall of the bucket below the outward-rolled top-rim, $b$, while the upper part, C, which has the eye for engagement of the wire-bail, $d$, projects above the said top-rim. At each side is an upward-facing shoulder, $g$, which takes position under the said outward-rolled top-rim, $b$; the sides of the ear extend downward and constitute the lowermost parts, $h$, which are separated by a notch, $i$; between the two sides is an outward-pressed flute, $f$, which extends vertically downward and its lower end terminates at the top of the notch and above the bottom edges of the lowest parts, $h$, and said end forms an abrupt down-facing shoulder, $e$.

When these tapered buckets are "nested" and form a stack containing twelve buckets, the weight of all the upper buckets in the stack, rests on the down-facing shoulders, $e$, of the lowermost buckets, and causes great strain thereon; it is therefore important to provide a construction for said shoulders, $e$, that will afford the requisite strength to withstand said strain. The formation of the outward-pressed flute, $f$, with its lower end cut off abruptly, supplies this desideratum.

It will be seen by reference to Fig. 4, which shows the top parts of two tapered buckets nested, that the downward-facing shoulder, $e$, of the two bail-ears of the inside bucket is so resting on the top-edge or rim, $b$, of the outside bucket or on the top rim and also on the turned-down bail, as to prevent the inside bucket from being forced down within the outer bucket and therefore will prevent wedging. It will also be understood as to the inner bucket that the lowermost parts, $h$, of the ear which are below the end of the vertical flute, $f$, fit in the space between the two buckets and cause the inner bucket to be centered within the outer bucket and thereby holds the inner bucket from shifting position laterally and prevents one of the said flute shoulders, $e$, from getting jammed between the two buckets.

Having thus described my invention what I claim and desire to secure by Letters Patent is,—

1. The herein-described bail-ear consisting of a stamped-up plate having an upward-projecting eye for engagement of a wire-bail, and each side extending downward and forming two lowermost parts, $h$, separated by a notch, $i$, and provided with an outward-pressed vertical flute, $f$, whose lower end terminates at the top of the notch and forms a down-facing shoulder, $e$.

2. The combination of a flaring or tapered bucket having a top-rim; and a bail-ear whose eye is above said top-rim and having two sides which extend downward and form two lowermost bottom edges which are separated at the center by a notch, and between said sides the bail-ear being provided with an outward-pressed vertical flute whose lower end terminates at the top of the notch and above said bottom edges and forms a down-facing shoulder.

In testimony whereof I affix my signature in presence of two witnesses.

CHARLES L. WAGANDT.

Witnesses:
G. FERDINAND VOGT,
CHARLES B. MANN, Jr.

Copies of this patent may be obtained for five cents each, by addressing the "Commissioner of Patents, Washington, D. C."